United States Patent [19]
Blom

[11] Patent Number: 5,293,788
[45] Date of Patent: Mar. 15, 1994

[54] ALTERNATE INPUT GEAR DRIVE

[75] Inventor: Eric C. Blom, Milwaukee, Wis.

[73] Assignee: Harnischfeger Corporation, Brookfield, Wis.

[21] Appl. No.: 956,182

[22] Filed: Oct. 5, 1992

Related U.S. Application Data

[63] Continuation of Ser. No. 608,916, Nov. 5, 1990, abandoned.

[51] Int. Cl.⁵ ............................................. F16H 37/06
[52] U.S. Cl. .................................... 74/661; 74/665 A; 74/665 GA
[58] Field of Search .............. 74/661, 665 A, 665 GA

[56] References Cited
U.S. PATENT DOCUMENTS

| | | | |
|---|---|---|---|
| 3,503,278 | 8/1968 | Livezey | 74/661 |
| 3,783,710 | 1/1974 | Steinhagen | 74/665 GA |
| 3,826,218 | 7/1974 | Hiersig et al. | 74/661 X |
| 4,106,603 | 7/1983 | Walter | 74/661 X |
| 4,392,393 | 7/1983 | Montgomery | 74/661 |
| 4,753,130 | 6/1988 | Rode | 74/665 |

Primary Examiner—Rodney H. Bonck
Assistant Examiner—Daniel Wittels
Attorney, Agent, or Firm—Ruppin: Richard C.

[57] ABSTRACT

A gear drive including an input gear having alternative first and second positions and which is selectively locatable at one of the first and second positions. The input gear includes a circumferential surface having a preselected first plurality of teeth when the input gear is located at the first position and a preselected second plurality of teeth larger than the first plurality of teeth when the input gear is located at the second position. A power source is connected to the input gear for rotating the input gear at a first rotational speed when the power source is connected to the input gear at the first position and at a slower second rotational speed when the power source is connected to the input gear at the second position. Output gears engage the input gear for receiving circumferential drive from the input gear which is at substantially the same velocity with the input gear located at both the first and second positions.

5 Claims, 4 Drawing Sheets

ALTERNATE INPUT GEAR DRIVE

This is a continuation of copending application Ser. No. 07/608,916 filed on Nov. 5, 1990 now abandoned.

FIELD OF THE INVENTION

This invention relates to a gear drive having alternate different speed inputs and an output having the same speed for each of the different speed inputs. More particularly, the invention relates to a gear drive for use in a surface mining shovel having separate inputs which are driven alternatively from different sources at different speeds and produce a substantially single speed output drive.

BACKGROUND OF THE INVENTION

In many types of industrial equipment, the components of the equipment are driven from a power source at specific speeds which are critical to the operation of the equipment. The type of power source and thereby the drive speeds available often depend on the power sources available at the location of the equipment and sometimes on the preference of the operator of the equipment. Diesel engines are a common type of power source, particularly for surface mining shovels equipment. Where the equipment is marketed worldwide as is typically the case of surface mining shovels and electrical power sources are used, the drive speeds available will be determined in part by whether the electrical power source frequency is 50 or 60 hertz.

The present approach to accommodating the differing drive power sources and speeds for surface mining shovels is to design the equipment so that its components receive the necessary speed drives from the power source that is available to the equipment at its intended operating site. Of course, individual designing of this nature is quite expensive. Moreover, where the equipment is designed to accept and operate from a single specific power source, it lacks the flexibility to be readily converted to operating from a different power source in the event that a different more desirable power source becomes available or the equipment is moved to a location requiring a change in power source.

SUMMARY OF THE INVENTION

It is a general object of this invention to provide a gear drive that produces a substantially single speed drive output when connected, alternatively, to different power sources operating at different drive speeds. It is a further object of this invention to provide a gear drive for surface mining shovels that may be connected to electrical motor or internal combustion engine power sources operating at different speeds and which produce substantially the same speed output when connected to either of such power sources.

The invention is accomplished by providing a gear drive including an input gear having alternative first and second positions and which is selectively locatable at one of the first and second positions. The input gear includes a circumferential surface having a preselected first plurality of teeth when the input gear is located at the first position and a preselected second plurality of teeth larger than the first plurality of teeth when the input gear is located at the second position. A power source is connected to the input gear for rotating the input gear at a first rotational speed when the power source is connected to the input gear at the first position and at a slower second rotational speed when the input drive means is connected to the input gear at the second position. Output gear means engages the input gear for receiving circumferential drive from the input gear which is at substantially the same velocity with the input gear located at both the first and second positions.

The number of teeth of the input gear when it is located at the first position and the first rotational speed of the input drive means are such that the rotational drive from the input gear to the output gear means is at a first speed. The number of teeth of the input gear when it is located at the second position and the second rotational speed of the input drive means are such that the rotational drive from the input gear to the output gear means is at a second speed substantially equal to the first speed.

The gear drive may also include an idler gear. The idler gear is located at the other of the first and second positions in engagement with the output gear means when the input gear is located at one of the first and second positions.

BRIEF DESCRIPTION OF THE DRAWINGS

Further objects and advantages of the invention will appear when taken in conjunction with the accompanying drawings, in which.

DETAILED DESCRIPTION OF THE INVENTION

Figure 1:
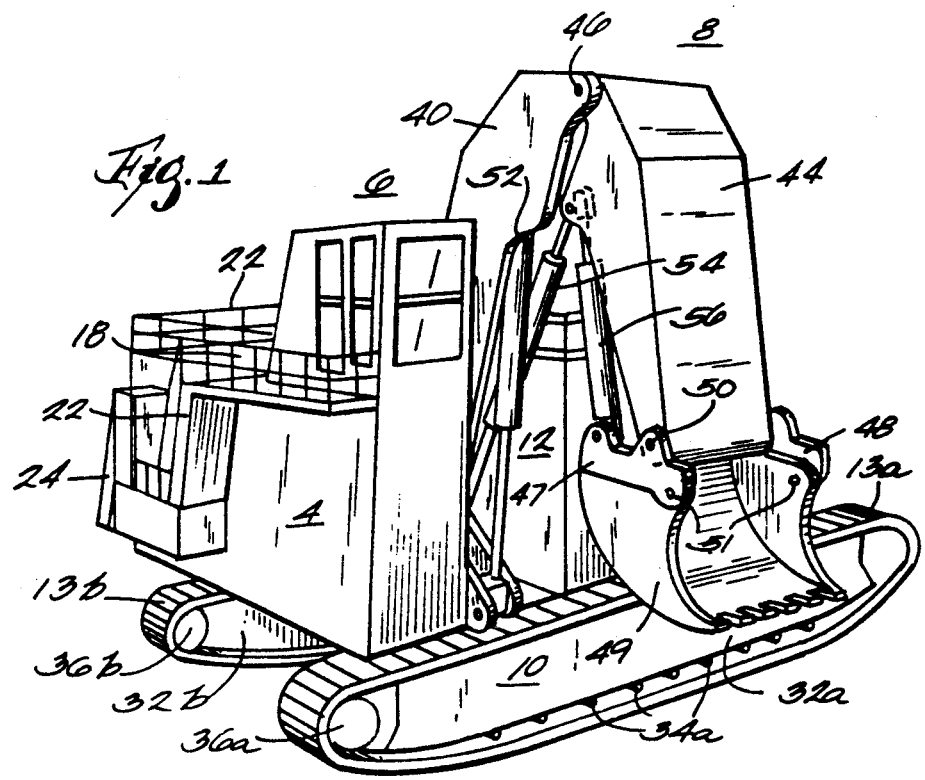
FIG. 1 is a side elevation view of a surface mining shovel incorporating the gear drive of the invention.
Figure 2:
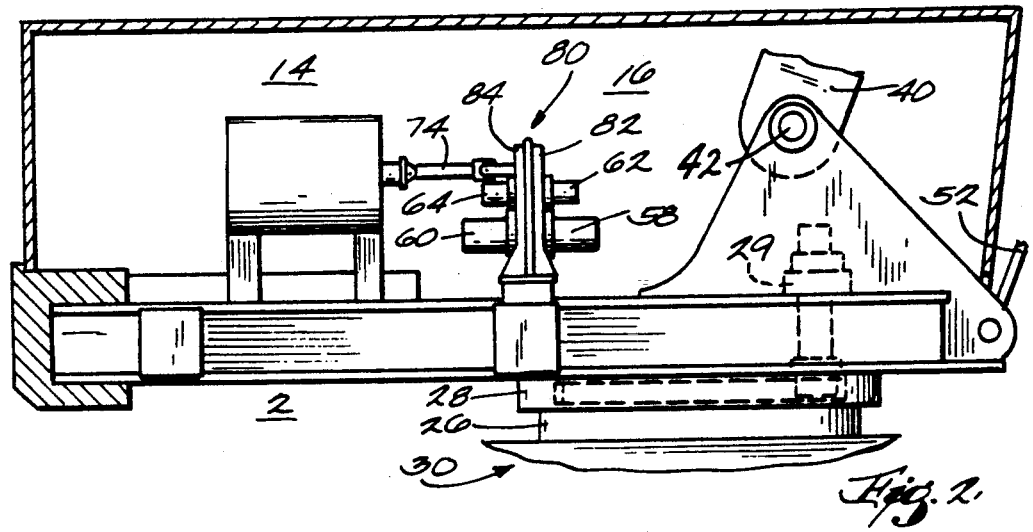
FIG. 2 is a side elevation view illustrating the gear drive of the invention mounted on the frame of the shovel shown in FIG. 1.

Referring generally to FIGS. 1 and 2, a surface mining shovel is illustrated as having a revolving frame 2, a machinery house 4 mounted on the frame 2, an operator's cab 6 mounted on the machinery house 4, a dipper structure 8 movably mounted on the frame 2, and a crawler frame 10 on which the frame 2 is supported and carrying crawler tracks 13a and 13b. A hydraulic system 12 is provided for operating the dipper structure, revolving the frame 2, and driving the crawler tracks 13a and 13b to permit movement of the shovel along the ground. A power source 14 and a gear drive 16, which will be described in greater detail hereinafter, furnish power to the hydraulic system 12.

The machinery house 4 has a deck 18 on its upper side, a stairway 20 to the deck, and a protective rail 22 along the stairway 20 and around the deck 18. The stairway 20 includes a section 24 shown in an upward retracted position in FIG. 1 and which can be extended down to the ground so that the stairway provides access to the machinery house, the deck 18 and the operator's cab 6. The crawler frame 10 includes a car body 30 having side frames 32a and 32b and an upwardly extending slewing rim 26 which is surrounded by and engages a downwardly extending slewing rim 28 which is part of the frame 2 to thereby support the frame 2. The frame 2 is driven in a revolving manner on the crawler frame 10 by a hydraulic swing motor and gear drive 29. The side frames 32a and 32b extend laterally from opposite sides of the car body 30. The crawler track 13a is supported for continuous movement on the rollers 34a mounted on the side frame 32a and the lug drive 36a. The crawler track 13b is supported on rollers similar to rollers 34a (not shown) mounted on the side frame 32b and a lug drive 36b.

With further reference to FIGS. 1 and 2, the dipper structure 8 includes a boom 40 pivotally mounted on the frame 2 at pin 42, an arm 44 pivotally connected to the boom 40 at pin 46, and a dipper 48 pivotally connected to the arm 44 at pin 50. The dipper 48 comprises a dipper back 47, and a dipper front 49. The dipper back 47 is pivotally connected to the arm 44 at pin 50. The dipper front 49 is pivotally connected to the dipper back 47 at pins 51 to allow the dipper back and front to pivotally move apart about pin 51 and dump any load in the dipper. The hydraulic system 12 includes hydraulic cylinders 52, 54 and 56 for respectively providing driving force for pivotal movement of the boom 40, the arm 44 and the dipper 48. Hydraulic cylinders, which are not shown, are also provided for opening and closing the dipper front and back. The hydraulic cylinders including cylinders 52, 54 and 56 and the lug drives 36a and 36b are operated by hydraulic fluid respectively from pumps 58 and 60, shown in FIG. 2. The swing motor and gear drive 29 is operated by hydraulic fluid from pump 62. A pump 64 provides pressurized hydraulic fluid for control and lubrication purposes. The hydraulic system 12 also includes other pumps and suitable hoses, piping, valves and filters connecting the pumps and the cylinders, motors, drives and other devices requiring pressurized hydraulic fluid which are well-known in the art and are not shown in the drawings for purposes of clarity.

With reference to FIGS. 2-5, the gear drive 16 includes a gear case 80 having a front half 82 and rear half 84, an input gear 86, an output gear section 88, and a case vent 78. The gear case 80 includes drive openings 90, 92, 94 and 96. The opening 90 is provided with a cover 98 attached to the casing half 84 and the opening 92 is provided with a vent cover 100 having an opening which receives and supports the vent 78. A shaft support cover 102 is attached to the front half 82 of the gear case over the opening 96 and receives and supports the input gear 86. A cover 104 is affixed to the rear half 84 of the gear case and covers the opening 94 and includes an opening 106 through which the input gear extends from within the gear case. The input gear 86 has an outer circumferential surface 108, a front shaft 110 extending into the cover 102, and a rear shaft 112 extending out of the gear case through the opening 106 in the cover 104 and carrying a shaft connector 118. An electrical motor power source 14 is connected to the connector 118 by a motor drive shaft 74 and rotates the input gear 86. The shafts 110 and 112 are respectively supported by bearings 114 mounted on cover 102 and bearings 116 mounted on the rear half 84 of the gear case 80. The output gear section 88 is divided into two groups 120 and 122 of output gears. The gear group 120 includes a transfer gear 124 and output gears 126 and 128 and the gear group 122 includes a transfer gear 130 and output gears 132 and 134. The input gear 86 is positioned between the two groups of output gears 120 and 122 and engages and drives each of them respectively through the transfer gears 124 and 130. The input gear 86 has a diameter 136 and a plurality of teeth 138 in the circumferential surface 108 that provides a preselected output circumferential drive velocity (feet per minute or fpm) to the gear groups 120 and 122 of the gear section 88 that produces a corresponding, preselected rotational drive speed (rpm) to the pumps 58, 60, 62 and 64 at the rotational drive speed (rpm) input to the input gear 86 from the power source 14.

Figure 2A:
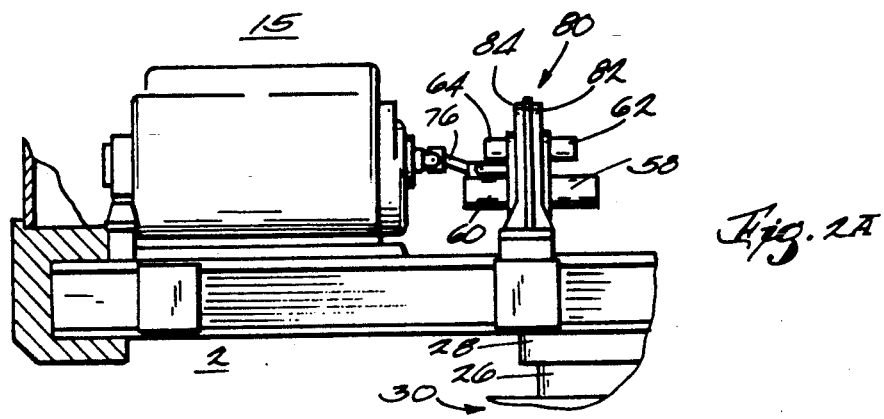
FIG. 2A is a side elevation view illustrating the gear drive of the invention with an alternative power source.
Figure 3:
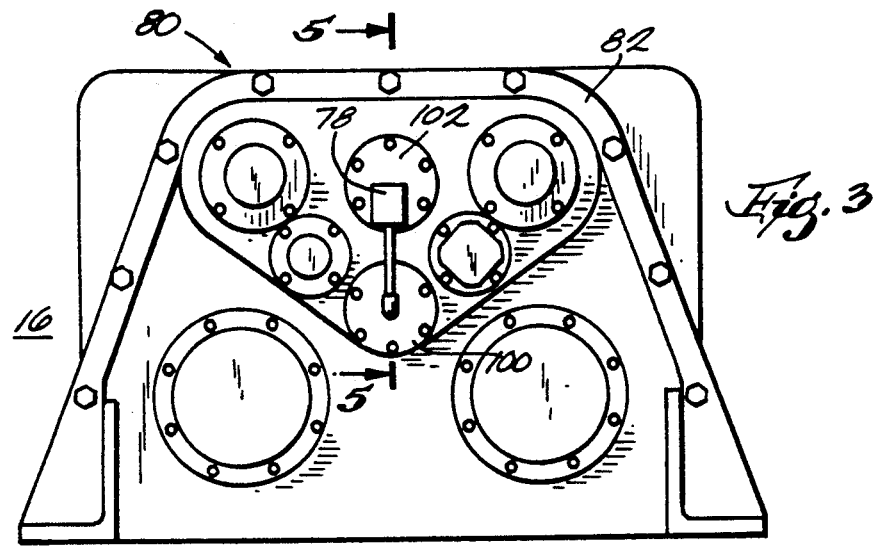
FIG. 3 is a side elevation view of the gear drive enclosed within its casing and arranged for connection at one of its alternate drive inputs.
Figure 4:
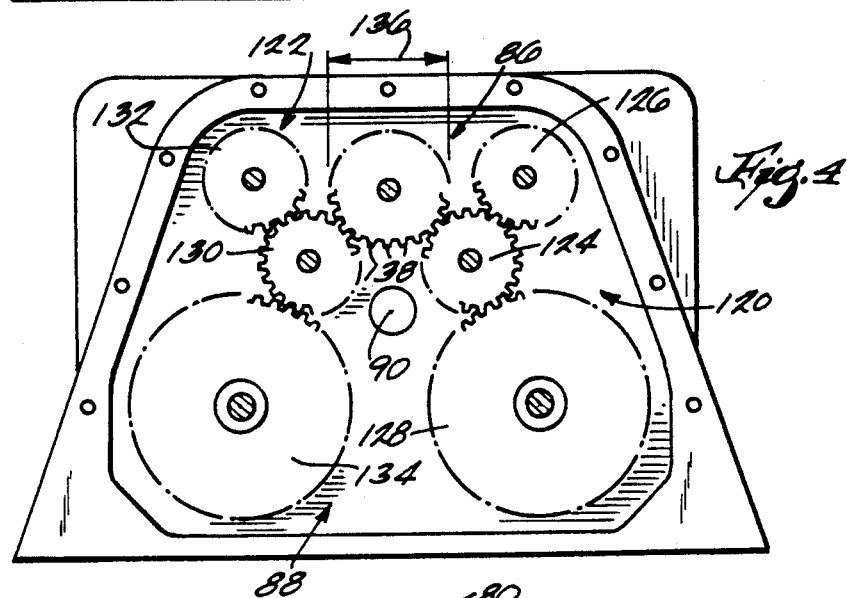
FIG. 4 is a side elevation view of the gear drive shown in FIG. 3 with a portion of the case removed.
Figure 5:
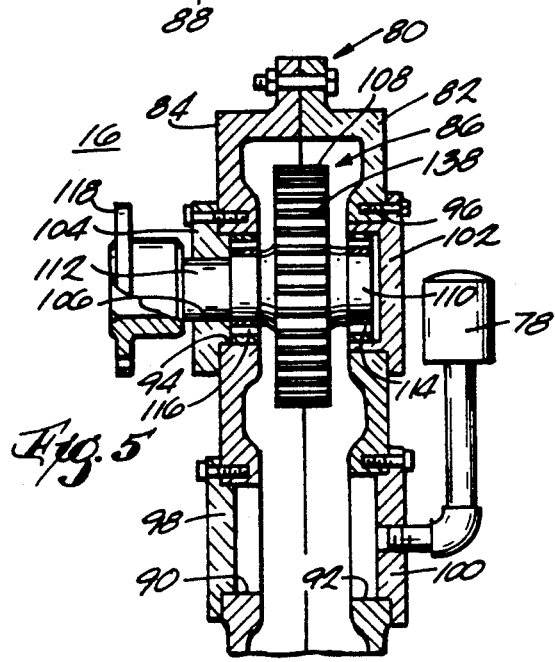
FIG. 5 is a cross-sectional view taken along lines 5—5 of FIG. 3 with some parts removed for purposes of clarity.
Figure 6:
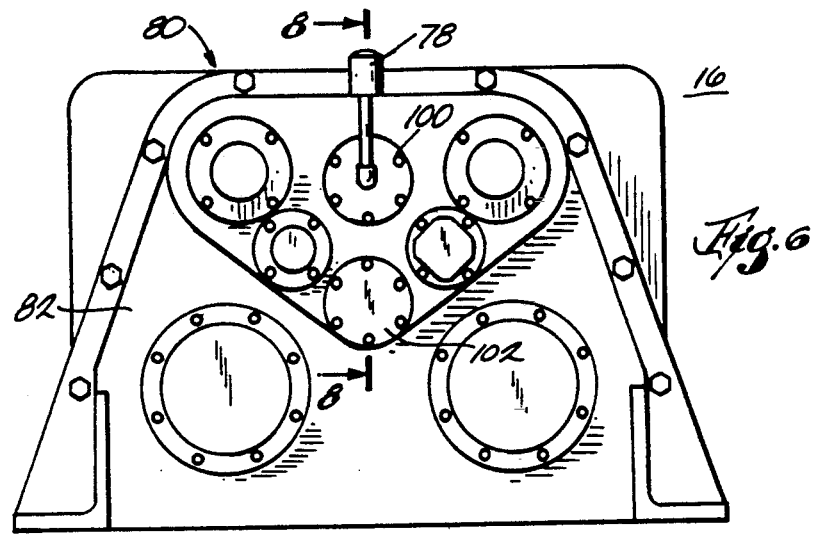
FIG. 6 is a side elevation view of the gear drive enclosed in its case and arranged for connection at one of its alternate drive inputs.
Figure 7:
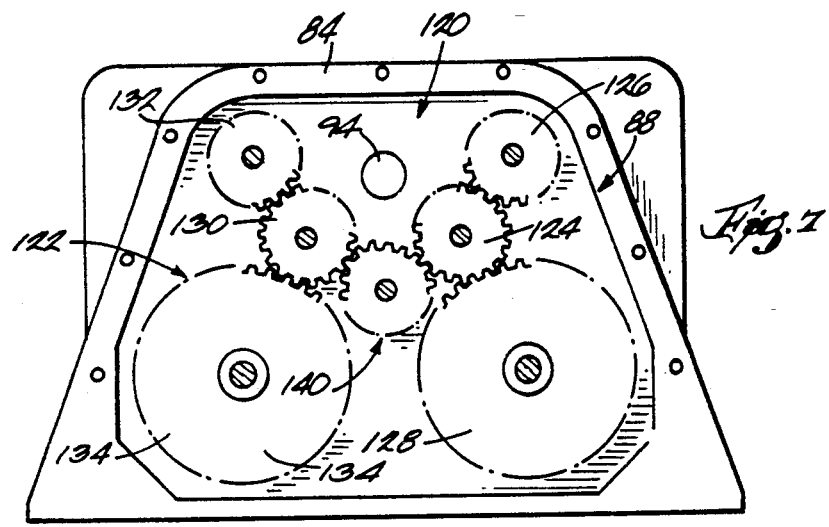
FIG. 7 is a side elevation view of the gear drive illustrated in FIG. 6 with a portion of the gear case removed.
Figure 8:
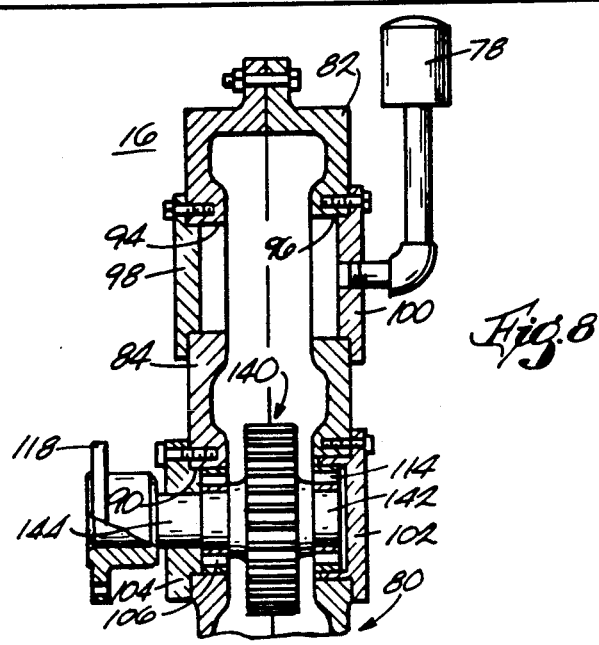
FIG. 8 is a cross sectional view taken along lines 8—8 in FIG. 6 with some parts removed for purposes of clarity.

With reference to FIGS. 6-8, the gear drive illustrated is identical to the gear drive illustrated in FIGS. 3-5 with the exception that the input gear has a smaller diameter and a lesser number of teeth and the components associated with it have different positions. Accordingly, with the exception of the input gear, numerals identifying the gear drive and its associated components illustrated in FIGS. 6-8 will be the same as the numerals used in FIGS. 3-5. The gear case 80 of gear drive 16 illustrated in FIGS. 6-8 has an input gear 140 including a front shaft 142 supported by bearings 114 in cap 102 which covers opening 92 in the front half of the gear case 80. The ring shaped cover 104 through which the rear shaft 144 extends covers the opening 90. The shaft 144 is supported by bearings 116 mounted in opening 90 and a shaft connector 118 is affixed to the shaft 144. A diesel engine power source 15, shown in FIG. 2A, is connected by an engine drive shaft 76 to the connector 118 shown in FIG. 8 and rotates the input gear 140. The cover 98 is affixed to the rear half 84 of the gear case and covers the opening 94. The vent cover 100 on which the vent 78 is supported is affixed to the front half 82 of the gear case and covers the opening 96.

The output gear section 88 of the gear drive 16 illustrated in FIGS. 6-8 is also divided into two groups 120 and 122 of output gears. The gear group 120 includes a transfer gear 124 and output gears 126 and 128 and the gear group 122 includes a transfer gear 130 and output gears 132 and 134. The input gear 140 is positioned between the two groups of output gears 120 and 122 and engages and drives each of them respectively through the transfer gears 124 and 130. The input gear 140 has a diameter 146 and a plurality of teeth 148 in the circumferential surface 150 that provides a preselected output circumferential drive velocity (feet per minute or fpm) to the gear groups 120 and 122 of the gear section 88 that produces a corresponding, preselected rotational drive speed (rpm) to the pumps 58, 60, 62 and 64 at the rotational drive speed (rpm) input to the input gear 140 from the power source 14. The preselected drive speed provided by the gear section 88 to the pumps when connected to the input gear 140 is substantially the same as the preselected drive speed provided by the gear section 88 to the pumps when connected to input gear 86, varying only by small rpm values due to inability to utilize the exact number of gear teeth that will give precise speed matching speed deviations of the power sources due to loading and losses.

In FIG. 2, a power source 14 in the form of an electric motor running at, for example, approximately 1500 rpm based on a 50 hertz power supply is connected through shaft connector 118 to the input gear 86. At a power source drive input of 1500 rpm, the typical speeds of the pumps operated by the gear drive 16 require that the input gear 86 have 81 teeth, the transfer gears 124 and 130 each have 68 teeth, the output gears 126 and 128 each have 67 teeth, and the output gears 132 and 134 each have 151 teeth. The transfer gears will then rotate at 1786 rpm and have a circumferential surface velocity which rotates the output gears 126, 132 and 128, 134 respectively at 1813 rpm and 804 rpm. In FIG. 2A, a power source 15 in the form of diesel engine running at, for example, approximately 1800 rpm is connected through shaft connector 118 to the input gear 140. At a power source drive input of 1800 rpm, the typical speeds of the pumps operated by the gear drive 16 require that the input gear 140 have 67 teeth, the transfer gears 124 and 130 each have 68 teeth, the output gears 126 and 128 each have 67 teeth, and the output gears 132 and 134 each have 151 teeth. The transfer gears will then rotate at 1778 rpm and have a circumferential surface velocity which rotates the output gears 126, 132 and 128, 134 respectively at 1802 rpm and 800 rpm. Thus, with either of the alternative power source inputs to the input gears, the circumferential gear surface velocity to the output gears rotates the output gears at substantially the same speed.

The input gears 86 and 140 may be considered as a single gear having alternate positions and circumferential surface lengths and teeth numbers which are connected to corresponding alternative power sources having different input rotating speeds. The combination of the differing input rotating drive speeds from the power sources 14 or 15 and the differing numbers of teeth on the input gear are such that the circumferential velocity of the input gear drives the output gear section 88 at the same rotational speed, i.e. rpm. More specifically, the input gear 140 having a smaller diameter, a smaller circumferential surface length and a smaller number of teeth, is driven at a higher rotational input speed by the diesel engine power source 15 shown in FIG. 2A. This provides a desired preselected output circumferential surface velocity to the transfer gears 124 and 130 such that they drive the output gears 126, 128, 132 and 134 at preselected rotational speeds. On the other hand, the input gear 86 having a larger diameter, a larger circumferential surface length, and a larger plurality of teeth along the circumferential surface, is driven at a higher rotational speed by a power source 14 such as the 50 hz electrical motor power source 14 shown in FIG. 2. This provides substantially the same preselected output circumferential surface velocity to the transfer gears 124 and 130 such that they drive the output gears 126, 128, 132 and 134 at substantially the same preselected speed as when the gear drive 16 is driven at a faster speed by a power source 15 such as the diesel engine power source 15.

Figure 9:
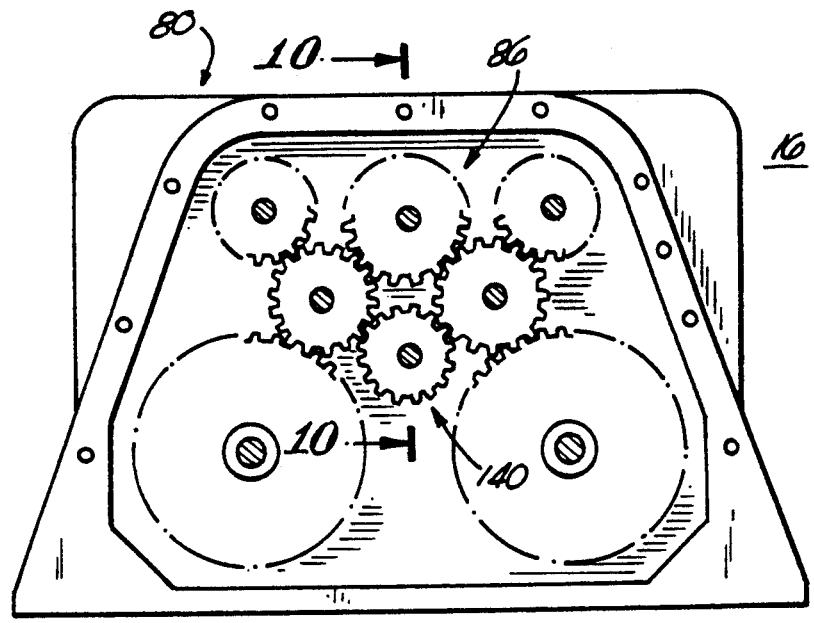
FIG. 9 is a side-elevation view similar to that of FIG. 4 illustrating another embodiment of the invention.
Figure 10:
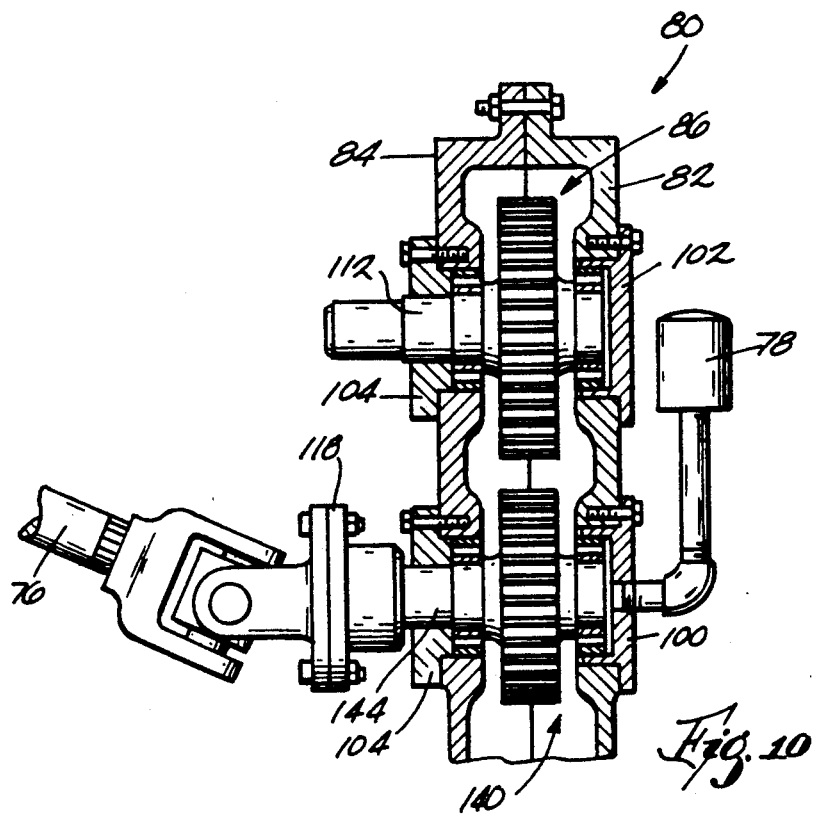
FIG. 10 is a cross-sectional view taken along lines 10—10 of FIG. 9.

With reference to FIGS. 9 and 10, an alternate embodiment of the invention is illustrated in which an input gear is positioned in engagement with the output gear section simultaneously at both of the positions of the input gears 86 and 140 respectively shown in FIGS. 3-5 and 6-8. In view of the similarity of the gear drive shown in FIGS. 9 and 10 with the gear drives shown in FIGS. 3-8, the components in FIGS. 9 and 10 which correspond to those in FIGS. 3-8, carry the same identifying numerals and only the modifications shown in FIGS. 9 and 10 are described in detail.

In FIGS. 9 and 10, both input gears 86 and 140 are mounted in the gear case 80. The input shafts 112 and 144 both extend from the gear case 80, but only one carries a shaft connector and is connected to a power source 14 or 15, depending on which power source is available or selected. In FIG. 10, the diesel engine power source 15 is shown connected to input gear 140 through connector 118.

However, when only one of the input gears 86 or 140 is driven by a power source, the other of the input gears is not driven and actually then is an idler gear which simply is driven or rotates at a speed determined by the rotational speed of the transfer gears 124 and 130. In this embodiment of the invention, then, both input gears are included and positioned in engagement with the output gear section 88 and the gear drive is alternately connected to either of two different speed power sources without any modification of the gear drive.

It will be understood that the foregoing description of the present invention is for purposes of illustration only and that the invention is susceptible to a number of modifications or changes, none of which entail any departure from the spirit or scope of the present invention as defined in the hereto appended claims.

I claim:

1. A gear drive connected between a power drive source and a driven device, comprising:
    input gear means connected to the power drive source for being driven by the power drive source, the power drive source alternatively having a first input rotational drive speed and a different second input rotational drive speed, the input gear means having the same output circumferential drive velocity when driven at both the first and second input rotational drive speeds, the input gear means including an input gear connected to the power drive source and having alternative selectively locatable first and second positions, the input gear being located at the first position when the power drive source is at the first drive speed and located at the second position when the power drive source is at the second drive speed; and
    output gear means connected to the driven device and engaging the input gear means for receiving circumferential drive from the input gear means at said same output circumferential drive velocity and rotating the driven device.

2. The gear drive according to claim 1 wherein:
    the output gear means comprises two groups of output gears; and
    at each of its alternative positions, the input gear is positioned between the two groups of output gears and is engaged by a gear in each of the two groups of output gears.

3. The gear drive according to claim 2 wherein the input gear engages the same gear in each of the two groups of output gears at each one of the alternative positions of the input gear.

4. A gear drive including a gear enclosure comprising:
    an input gear mounted within the enclosure and having an input shaft, the input gear having alternative first and second positions and being selectively locatable at one of the first and second positions, the input gear including a circumferential surface having a preselected first plurality of teeth when the input gear is located at the first position and a preselected second plurality of teeth larger than the first plurality of teeth when the input gear is located at the second position;

input drive means connected to the input gear for rotating the input gear, the input drive means having a first rotational speed when connected to the input gear at the first position and a slower second rotational speed when connected to the input gear at the second position; and output gear means mounted with the enclosure and including an output gear having an output shaft and a transfer gear having a support shaft, the output and transfer gears both having fixed shaft positions, the transfer gear engaging the output gear and the circumferential surface of the input gear for receiving circumferential drive from the input gear, the circumferential drive being at substantially the same velocity with the input gear located at both the first and second positions.

5. A gear drive, including a gear enclosure, comprising:

first and second input gears respectively mounted at first and second positions within the enclosure and having respective first and second input shafts extending out of the enclosure, the first input gear including a first circumferential surface having a preselected first plurality of teeth and the second input gear including a second circumferential surface having a preselected second plurality of teeth larger than the first plurality of teeth;

input drive means connected to one of the first and second input gears exterior of the enclosure for rotating said one of the input gears, the input drive means having a first rotational speed when connected to the first input gear and a slower second rotational speed when connected to the second input gear;

output gear means including a a pair of transfer gears mounted within the enclosure, each transfer gear having a fixed circumference and a shaft having a fixed shaft position, each transfer gear engaging both the first and second input gears for receiving rotational drive from the one of the first and second input gears to which the input drive means is connected, the rotational drive being at substantially the same speed with the input drive means connected to either of the first and second input gears;

the pair of transfer gears are spaced apart and the first and second input gears are both positioned between the transfer gears; and the one of the first and second input gears to which the input drive means is not connected is in an idle condition and driven by the output gear means.

* * * * *